(12) United States Patent
Harvey et al.

(10) Patent No.: US 7,926,837 B2
(45) Date of Patent: Apr. 19, 2011

(54) INFLATABLE VEHICLE OCCUPANT PROTECTION DEVICE WITH INFLATION FLUID DEFLECTOR

(75) Inventors: Jeffery A. Harvey, Sterling Heights, MI (US); Rickey L. Stratton, Pontiac, MI (US); Wilfried Burghardt, Macomb, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 150 days.

(21) Appl. No.: 12/322,447

(22) Filed: Feb. 3, 2009

(65) Prior Publication Data

US 2010/0194078 A1 Aug. 5, 2010

(51) Int. Cl.
*B60R 21/203* (2006.01)
*B60R 21/217* (2006.01)

(52) U.S. Cl. ............ 280/728.2; 280/731; 280/736; 280/740; 280/741; 280/742

(58) Field of Classification Search ......... 280/728.2, 280/731, 736, 740, 741, 742
See application file for complete search history.

(56) References Cited

U.S. PATENT DOCUMENTS

| | | | | |
|---|---|---|---|---|
| 4,902,036 A * | 2/1990 | Zander et al. | | 280/736 |
| 5,246,249 A * | 9/1993 | Satoh | | 280/731 |
| 5,658,008 A * | 8/1997 | Herrmann et al. | | 280/728.2 |
| 5,683,100 A * | 11/1997 | Enders | | 280/728.2 |
| 5,836,608 A | 11/1998 | Soderquist et al. | | |
| 5,860,672 A * | 1/1999 | Petersen | | 280/728.2 |
| 6,082,765 A | 7/2000 | Bowers et al. | | |
| 6,089,600 A * | 7/2000 | Schenck et al. | | 280/740 |
| 6,149,192 A * | 11/2000 | Swann et al. | | 280/740 |
| 6,155,599 A * | 12/2000 | Bowers et al. | | 280/740 |
| 6,213,502 B1 * | 4/2001 | Ryan et al. | | 280/736 |
| 6,364,342 B1 | 4/2002 | Kim | | |
| 6,439,603 B2 * | 8/2002 | Damman et al. | | 280/736 |
| 6,679,518 B2 * | 1/2004 | Varcus et al. | | 280/728.2 |
| 6,702,318 B2 * | 3/2004 | Rose et al. | | 280/728.2 |
| 6,854,760 B2 | 2/2005 | Whited et al. | | |
| 6,926,303 B2 | 8/2005 | Fischer et al. | | |
| 7,311,324 B2 * | 12/2007 | Okada et al. | | 280/728.2 |
| 2003/0080542 A1 | 5/2003 | Grosch et al. | | |
| 2004/0160039 A1 | 8/2004 | Heist et al. | | |
| 2004/0256840 A1 | 12/2004 | Lutter et al. | | |
| 2005/0067818 A1 | 3/2005 | Laue | | |
| 2006/0125217 A1 | 6/2006 | Nakamura et al. | | |

* cited by examiner

*Primary Examiner* — Ruth Ilan
*Assistant Examiner* — Laura Freedman
(74) *Attorney, Agent, or Firm* — Tarolli, Sundheim, Covell & Tummino LLP

(57) ABSTRACT

An apparatus (10) for helping to protect an occupant (16) of a vehicle (12) comprises an inflatable vehicle occupant protection device (14) that is inflatable from a deflated condition to an inflated condition. An inflator (32) is actuatable to provide inflation fluid to inflate the protection device (14). A retainer (70) has an opening (78) for receiving the inflator (32). The retainer (70) includes a base portion (72) and an annular wall (74) that extends transversely from the base portion (72). The annular wall (74) has a deflector portion (88) and a retaining portion (86). The deflector portion (88) is positioned radially outward from the retaining portion (86) and extends substantially orthogonal to the base portion (72) to direct inflation fluid from the inflator (32) into the protection device (14) in a direction substantially parallel to a central axis (37) of the inflator (32). The retaining portion (86) extends radially inward from the deflector portion (88) and clamps a flange (35) of the inflator (32) to a support member (34).

19 Claims, 6 Drawing Sheets

INFLATABLE VEHICLE OCCUPANT PROTECTION DEVICE WITH INFLATION FLUID DEFLECTOR

TECHNICAL FIELD

The present invention is related to an inflatable vehicle occupant protection device for helping to protect an occupant of a vehicle upon the occurrence of an event for which occupant protection is desired, such as a vehicle collision.

BACKGROUND OF THE INVENTION

It is known to provide an inflatable vehicle occupant protection device, such as an air bag, for helping to protect an occupant of a vehicle. A driver frontal air bag is inflatable between an occupant of a front seat of the vehicle and the steering wheel of the vehicle. When inflated, the air bag helps protect an occupant from impacts with parts of the vehicle, such as the steering wheel of the vehicle. During inflation, it may be desirable to prevent initial contact between the inflation fluid and the air bag as the inflation fluid exits the inflator.

SUMMARY OF THE INVENTION

The present invention is directed to an apparatus for helping to protect an occupant of a vehicle. The apparatus includes an inflatable vehicle occupant protection device that is inflatable from a deflated condition to an inflated condition. An inflator has an annular flange and inflation fluid outlets. The inflator is actuatable to provide inflation fluid through the inflation fluid outlets to inflate the protection device. A retainer has an opening for receiving the inflator. The retainer comprises a base portion and an annular wall that extends transversely from the base portion. The annular wall has a deflector portion and a retaining portion. The deflector portion is positioned radially outward from the retaining portion and extends substantially orthogonal to the base portion to direct inflation fluid from the inflator into the protection device in a direction substantially parallel to a central axis of the inflator. The retaining portion extends radially inward from the deflector portion and clamps the flange of the inflator to the support member.

The present invention is also directed to another apparatus for helping to protect an occupant of a vehicle. The apparatus includes an inflatable vehicle occupant protection device that is inflatable from a deflated condition to an inflated condition. An inflator has an annular flange and inflation fluid outlets. The inflator is actuatable to provide inflation fluid through the inflation fluid outlets to inflate the protection device. A retainer has an opening for receiving the inflator. The retainer includes a base portion extending along a plane and an annular wall that extends transversely from the base portion. The annular wall has a deflector portion and a retaining portion. The deflector portion is positioned radially outward from the retaining portion and extends above the plane substantially orthogonal to the base portion to direct inflation fluid from the inflator into the protection device in a direction substantially parallel to a central axis of the inflator. The retaining portion extends radially inward from the deflector portion and below the plane of the base portion to clamp the flange of the inflator to the support member.

BRIEF DESCRIPTION OF THE DRAWINGS

The foregoing and other features of the present invention will become apparent to those skilled in the art to which the present invention relates upon reading the following description with reference to the accompanying drawings, in which.

DETAILED DESCRIPTION

Figure 1:
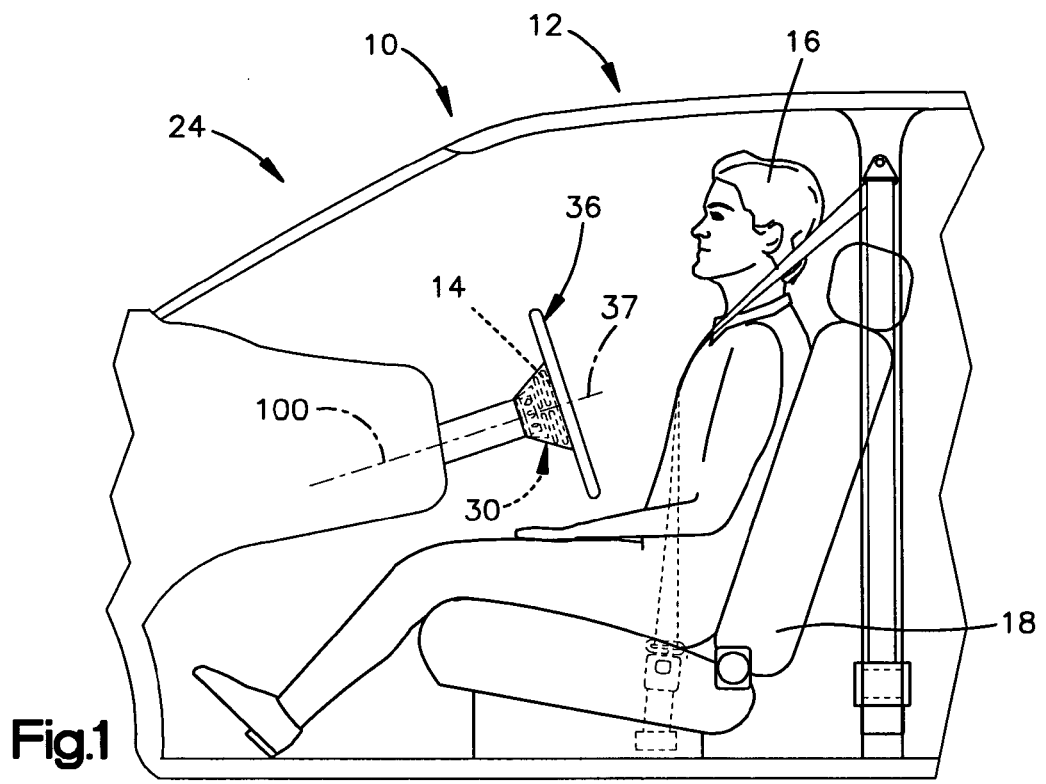
FIG. 1 is a schematic illustration of an apparatus for helping to protect an occupant of a vehicle according to the present invention.
Figure 2:
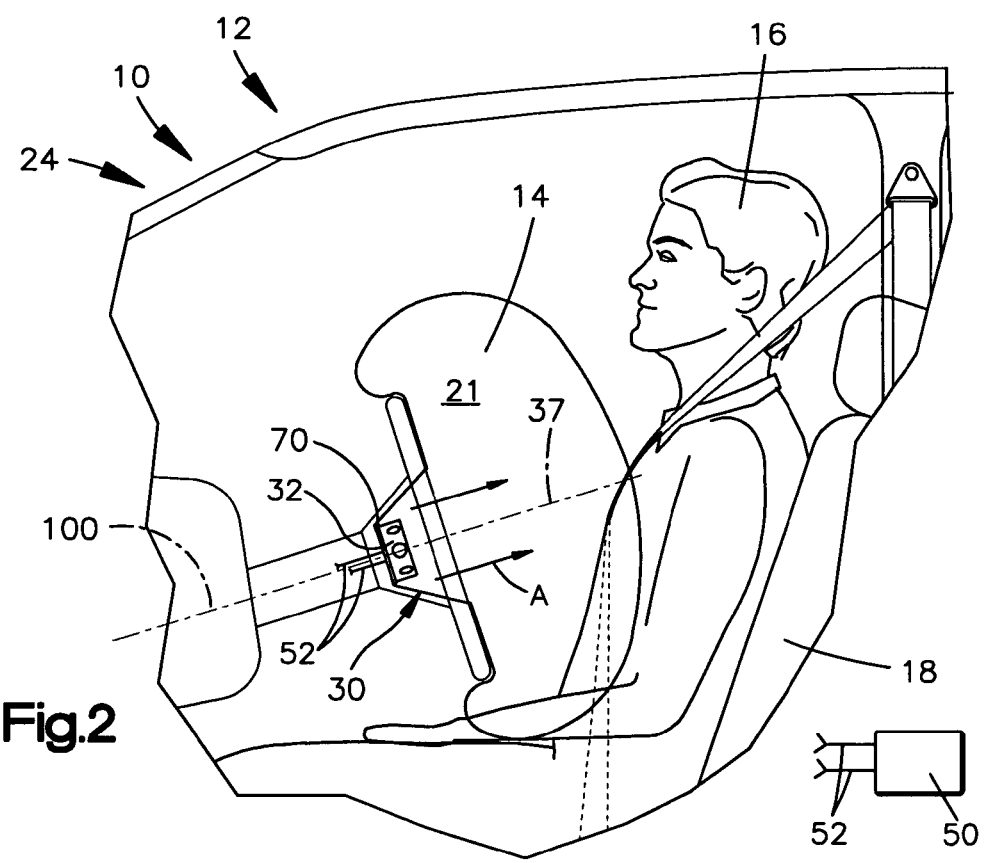
FIG. 2 is a schematic view of a portion of the apparatus of FIG. 1 in a deployed condition.

The present invention is related to an inflatable vehicle occupant protection device for helping to protect an occupant of a vehicle upon the occurrence of an event for which occupant protection is desired, such as a vehicle collision. Representative of the present invention, FIGS. 1 and 2 illustrate an apparatus 10 for helping to protect an occupant 16 of a vehicle 12. The apparatus 10 includes an inflatable vehicle occupant protection device 14 in the form of an air bag for helping to protect a vehicle occupant 16. The occupant 16 illustrated in FIGS. 1 and 2 is an operator of the vehicle 12 positioned in a seat 18 on a driver side of the vehicle. The air bag 14 illustrated in FIGS. 1 and 2 thus may be referred to as a driver frontal air bag.

Figure 3:
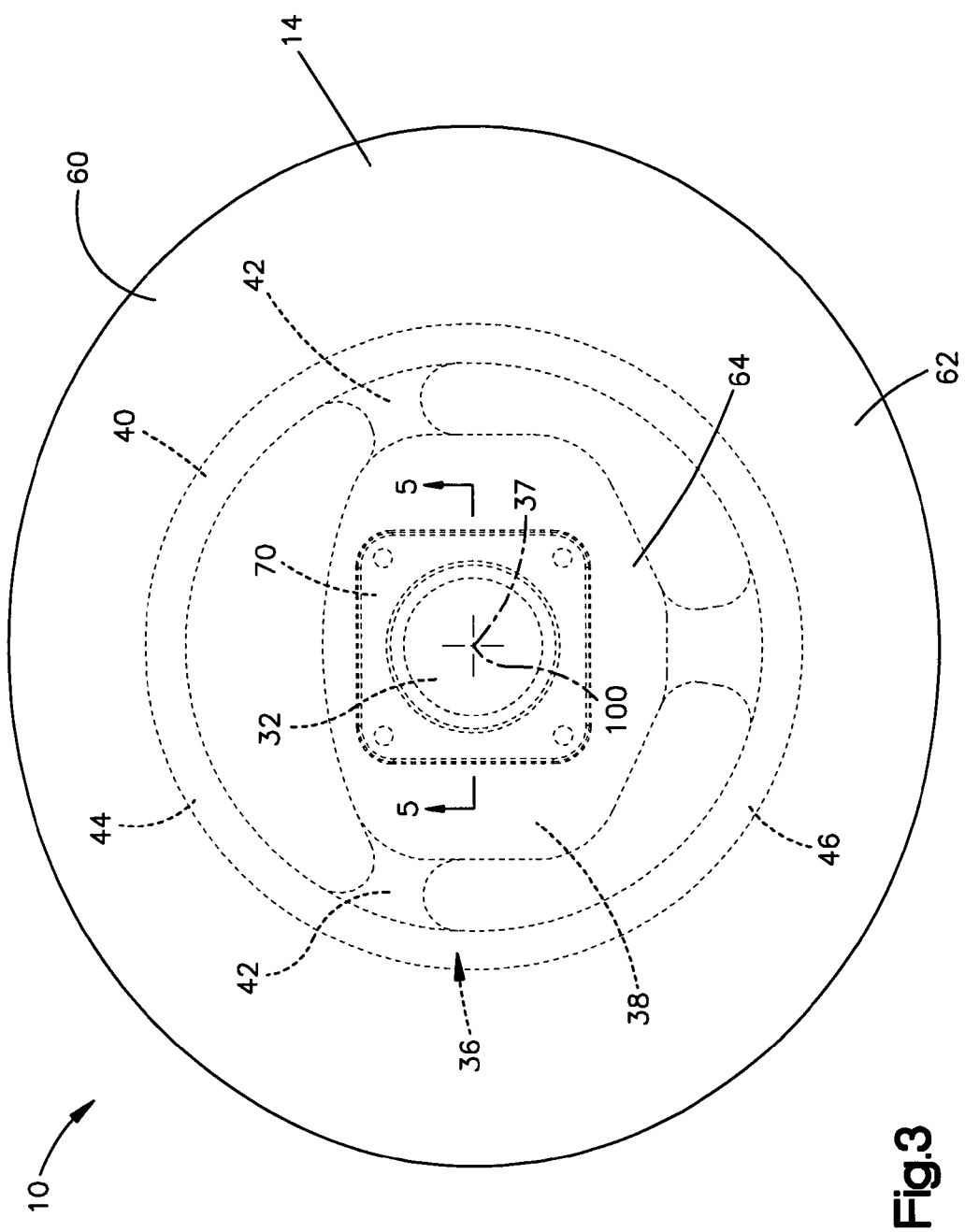
FIG. 3 is a schematic illustration of a portion of the apparatus of FIGS. 1 and 2.

The air bag 14 is a component of an air bag module 30 that includes an inflation fluid source 32 in the form of an inflator. The air bag module 30 is connected to a steering wheel 36. As shown in FIG. 3, the steering wheel 36 has a central hub 38, a rim 40 and a plurality of spokes 42 interconnecting the hub and the rim. The steering wheel rim 40 has an upper portion 44 and a lower portion 46 and rotates about a central axis 100.

The air bag 14 has a stored condition, indicated by dashed lines in FIG. 1, in which the air bag is folded and secured to a support member, such as a reaction plate 34 (see FIG. 5) that is connected to the steering wheel 36. The reaction plate 34 thus may help support the air bag 14, inflator 32, and other components of the air bag module 30 on the steering wheel 36.

The air bag 14 can be constructed of any suitable material, such as nylon (e.g., woven nylon 6-6 yarns), and may be constructed in any suitable manner. For example, the air bag 14 may include one or more pieces or panels of material. If more than one piece or panel is used, the pieces or panels may be interconnected by known means, such as stitching, ultrasonic welding, heat bonding, or adhesives, to form the air bag. The air bag 14 may be uncoated, coated with a material, such as a gas impermeable urethane, or laminated with a material, such as a gas impermeable film. The air bag 14 thus may have a gas-tight or substantially gas-tight construction. Those skilled in the art will appreciate that alternative materials, such as polyester yarn, and alternative coatings, such as silicone, may also be used to construct the air bag 14.

Figure 4:
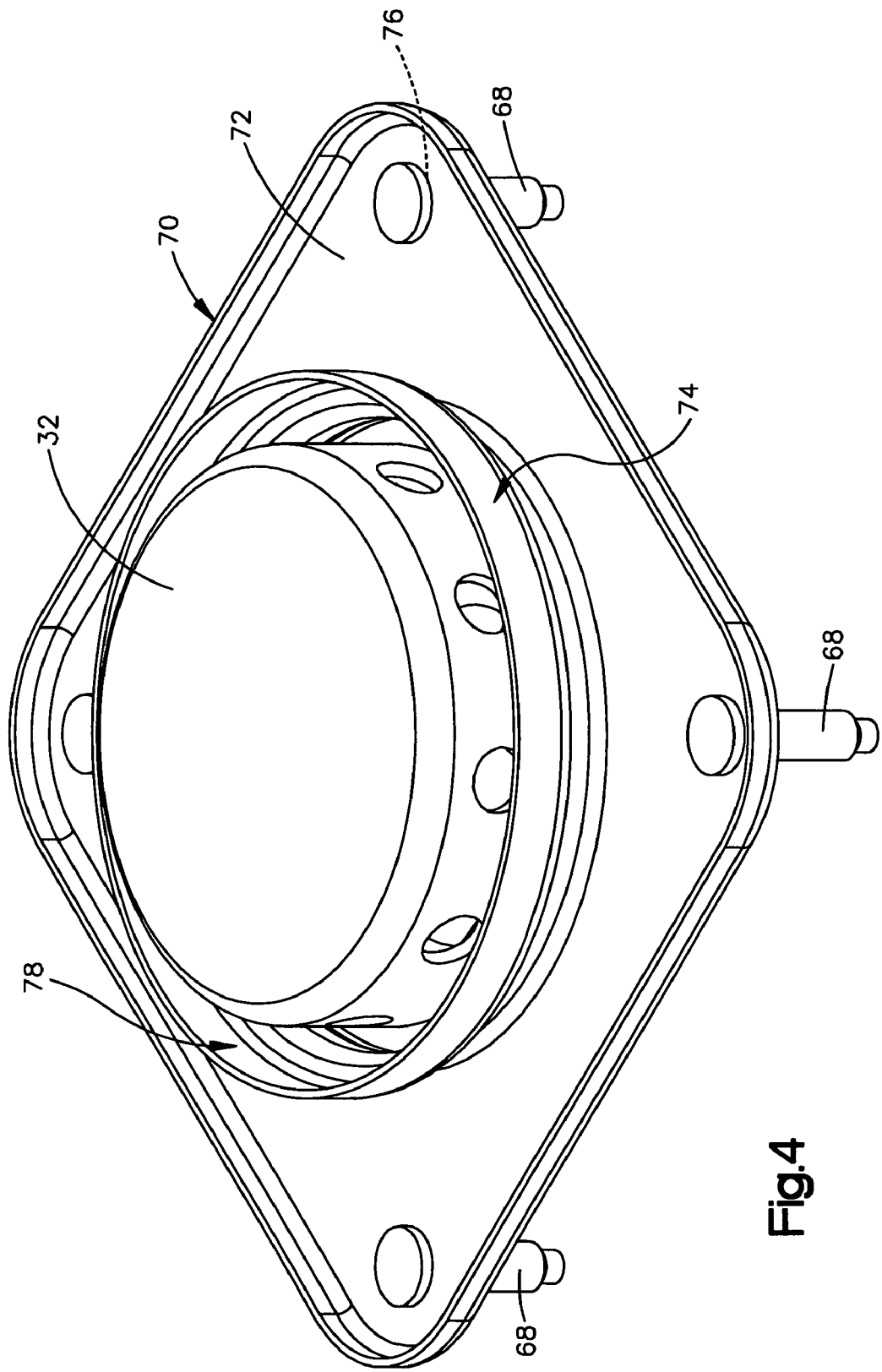
FIG. 4 is a perspective view of a portion of the apparatus in accordance with a first embodiment of the present invention.
Figure 5:
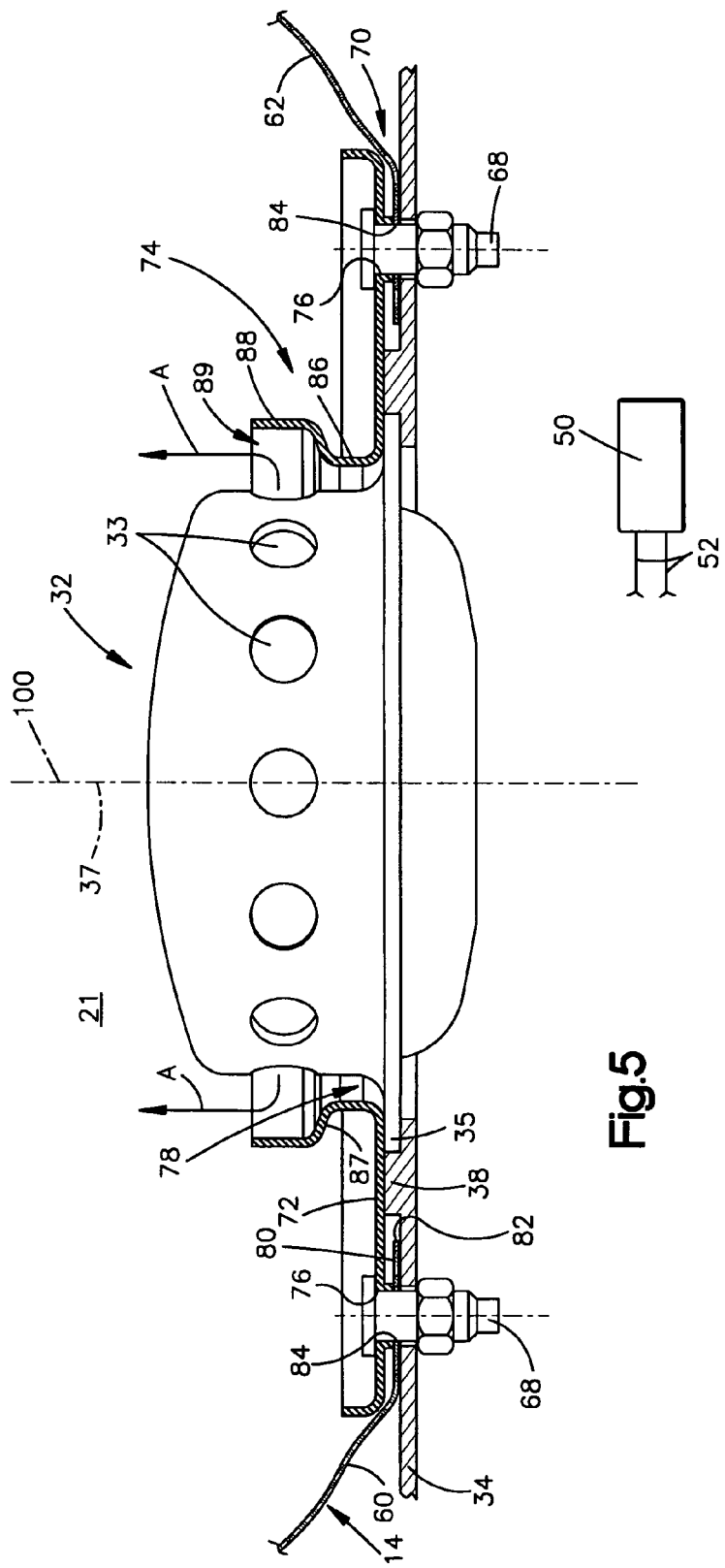
FIG. 5 is a section view of the portion of FIG. 3 taken generally along line 5-5 in FIG. 3 and illustrated in an installed condition on a vehicle steering wheel.

Referring to FIGS. 3-5, the inflator 32 is actuatable to provide inflation fluid to an inflatable volume 21 of the air bag 14 to inflate and deploy the air bag. The inflator 32 is illustrated schematically and may be of any known type, such as a stored gas inflator, a solid propellant inflator, an augmented inflator, or a hybrid inflator. In the embodiment illustrated in FIGS. 3-5, the inflator 32 has a generally rounded, cylindrical configuration. The inflator 32 includes a plurality of inflation fluid outlets 33 distributed around its periphery. The inflator 32 is positioned relative to the steering wheel 36 such that a central axis 37 of the inflator is co-axial with the central axis 100 of the steering wheel.

The apparatus 10 also includes a sensor, illustrated schematically at 50 in FIG. 2, for sensing an event for which inflation of the air bag 14 is desired, such as a vehicle impact. The inflator 32 is operatively connected to the sensor 50 via lead wires 52. Upon sensing the occurrence of an event for which inflation of the air bag 14 is desired, the sensor 50 provides a signal to the inflator 32 via the lead wires 52. Upon receiving the signal from the sensor 50, the inflator 32 is actuated and provides inflation fluid to the air bag 14 in a known manner to inflate and deploy the air bag from the stored condition (FIG. 1) to the deployed condition (FIG. 2). The air bag 14, while inflated, helps protect the vehicle occupant 16. As best shown in FIG. 3, when in the deployed condition, the air bag 14 has an upper portion 60 positioned adjacent the upper portion 44 of the steering wheel rim 26, and a lower portion 62 positioned adjacent the lower portion 46 of the steering wheel rim 26.

Referring to FIGS. 4 and 5, the apparatus 10 also includes a retainer 70 for helping to secure the inflator 32 and the air bag 14 to the reaction plate 34 and for helping to direct the flow of inflation fluid from the inflator into the inflatable volume 21 of the air bag 14. The retainer 70 may be constructed of any suitable material, such as metal or plastic, and includes a base portion 72 and an annular wall 74. The base portion 72 has a generally planar, ring-shaped configuration. In the embodiment illustrated in FIGS. 3 and 4, the periphery of the base portion 72 has a generally square or rectangular ring-shaped configuration. The periphery of the base portion 72 could, however, have an alternative configuration (not shown), such as a generally round or rounded ring-shaped configuration. The base portion 72 includes a plurality of holes 76 (see FIG. 5) for receiving fasteners 68. Alternatively, the fasteners 68 may be integrally formed with the base portion 72, e.g., molded into the plastic of the base portion. Although four holes 76 and corresponding fasteners 68 are illustrated, those having ordinary skill in the art will appreciate that more or fewer fasteners may be used.

The fasteners 68 cooperate with the base portion 72 of the retainer 70 to secure the retainer to a support member of the vehicle 12, such as the reaction plate 34. In doing so, the annular wall 74 of the retainer 70 may secure the inflator 32 to the reaction plate 34. The annular wall 74 extends from the base portion 72 and includes a retaining portion 86 and a deflector portion 88. The retaining portion 86 is configured to secure or clamp a flange portion 35 of the inflator 30 to the reaction plate 34. In particular, the retaining portion 86 of the annular wall 74 extends radially inward from the base portion 72 and defines a central opening 78 of the retainer 70. The central opening 78 has a diameter that is less than the diameter of the flange portion 35 of the inflator 30. Although the retaining portion 86 is illustrated as having a C-shaped construction, those having ordinary skill in the art will appreciate that alternative constructions of the retaining portion may be used in accordance with the present invention.

In this instance, during installation, the inflator 32 is maneuvered and positioned relative to the central opening 78 of the retainer 70 such that the flange portion 35 of the inflator 30 is clamped between the retaining portion 86 of the annular wall 74 and the reaction plate 34 when the retainer is secured to the reaction plate via the fasteners 68. The reaction plate 34 may include structure 38 for receiving the flange portion 35 of the inflator 30 to hold the inflator and/or center the inflator in the central opening 78 of the retainer 70.

The retainer 70 may also help secure the air bag 14 to the vehicle 12. Referring to FIG. 5, the air bag 14 includes a mouth portion 80 that helps define an opening 82. The mouth portion 80 includes a plurality of holes 84, spaced about the periphery of the opening 82, that align with the holes 76 of the retainer 70. The mouth portion 80 of the air bag 14 is positioned between the base portion 72 of the retainer 70 and the reaction plate 34. Stud portions of the fasteners 68 are installed through the aligned holes 76 and 84 in the retainer 70 and the air bag 14, and through corresponding holes in the reaction plate 34. Nut portions of the fasteners 68 are then installed onto the stud portions thereby to interconnect the air bag 14, inflator 32, retainer 70, and reaction plate 34 to help form the air bag module 30. In this configuration, the fluid outlets 33 of the inflator 32 are positioned within the inflatable volume 21 of the air bag 14. Those having ordinary skill in the art will appreciate that the air bag module 30 may have alternative configurations.

It may be desirable to provide a gastight connection between the mouth portion 80 of the air bag 14, the base portion 72 of the retainer 70, and the reaction plate 34. Accordingly, the fasteners 68 may include shoulders (not shown), which increase the clamping surface area of the fasteners on the mouth portion 80 of the air bag 14 and, thus, help to provide a gastight connection. Furthermore, the reaction plate 34 and the base portion 72 of the retainer 70 may include mating structure (not shown) adjacent to the mouth portion 80 of the air bag 14 to help form a gastight connection.

According to the present invention, the deflector portion 88 is configured to direct inflation fluid into the inflatable volume 21 of the air bag 14 in a direction substantially parallel to the central axis 37 of the inflator 32. This helps prevent inflation fluid from being discharged directly from the inflator 32 into contact with the mouth portion 80 of the air bag 14 as the inflation fluid initially exits the inflator outlets 33. The deflector portion 88 extends parallel to the central axis 37 of the inflator 32 and perpendicular to the base portion 72 of the retainer 70. The deflector portion 88 extends away from the base portion 72 of the retainer 70 and is positioned radially outward from the retaining portion 86 relative to the central axis 37 of the inflator 32. The deflector portion 88 extends from the retaining portion 86 and, therefore, is contiguous with the retaining portion.

Advantageously, the annular wall 74 is configured such that inflation fluid exiting the inflator outlets 33 initially strikes the deflector portion 88 before striking the air bag 14. In particular, the annular wall 74 is positioned such that the deflector portion 88 covers a substantial portion of the area of the inflator outlets 33. By "covers a substantial portion of the area of the inflator outlets", it is meant that the deflector portion 88 is positioned relative to the inflator outlets 33 such that a substantial portion of the volumetric flow of inflation fluid exiting the inflator outlets is deflected by the deflector portion. Viewing the inflator outlets 33 perpendicular to the axis 100, the deflector portions 88 "covers" or overlies a substantial portion of the inflator outlets. The deflector portion 88 may, for example, cover at least 75% of the total area of the inflator outlets 33. Those having ordinary skill in the art, however, will appreciate that the deflector portion 88 may alternatively cover more or less of the total area of the inflator outlets 33.

The deflector portion 88, by extending substantially orthogonal to the base portion 72 of the retainer 70 and covering a substantial portion of the area of the inflator outlets 33, directs the inflation fluid away from the mouth portion 80 of the air bag 14 in a direction, indicated generally at A in FIG. 5, substantially parallel to the central axis 37 of the inflator 32. Directing the inflation fluid in this manner helps prevent inflation fluid from initially being discharged directly from the inflator 32 into contact with the mouth portion 80 of the air bag 14 and, thus, avoids immediate contact between hot inflation fluid exiting the inflator and the air bag.

As another advantage, the offset construction of the annular wall 74 provides a large volume space into which the inflation fluid exits from the inflator 32. The deflector portion 88, being radially offset from the retaining portion 86, helps define and maintain an annular space 89 into which inflation fluid is initially discharged radially from the inflator 32. This helps avoid restricting inflation fluid flow from the inflator 32, which promotes rapid inflation and deployment of the air bag 14. The offset, contiguous configuration of the annular wall 74 allows the retaining portion 86 of the annular wall to extend radially inward to provide the desired clamping of the inflator 32 and the air bag 14 while also positioning the deflector portion 88 to create the desired annular space 89.

The inflation fluid outlets 33 may be spaced uniformly around the periphery of the inflator 32 such that inflation fluid is emitted from the inflator in a substantially uniform manner, e.g., in terms of volumetric flow. Accordingly, the inflation fluid may be directed from the inflator 32 and into the annular space 89 in a substantially uniform manner. The deflector portion 88 thereby may direct inflation fluid out of the annular space 89 and in the direction A into both the upper portion 60 and the lower portion 62 of the air bag 14 in a manner such that the upper and lower portions inflate at substantially the same rate.

Consequently, for a given period of inflation time, the upper portion 60 of the air bag 14 may receive roughly the same volume of inflation fluid as the lower portion 62 of the air bag. The large volumetric flow into the upper and lower portions 60, 62 of the air bag 14 helps the air bag cover the upper and lower portions 44, 46 of the steering wheel rim 26 quickly. The apparatus of the present invention thus may be especially advantageous in helping to protect the vehicle occupant 20 when sifting in close proximity to the steering wheel 36, such as when the occupant's seat 18 is in a forward position.

Figure 6:
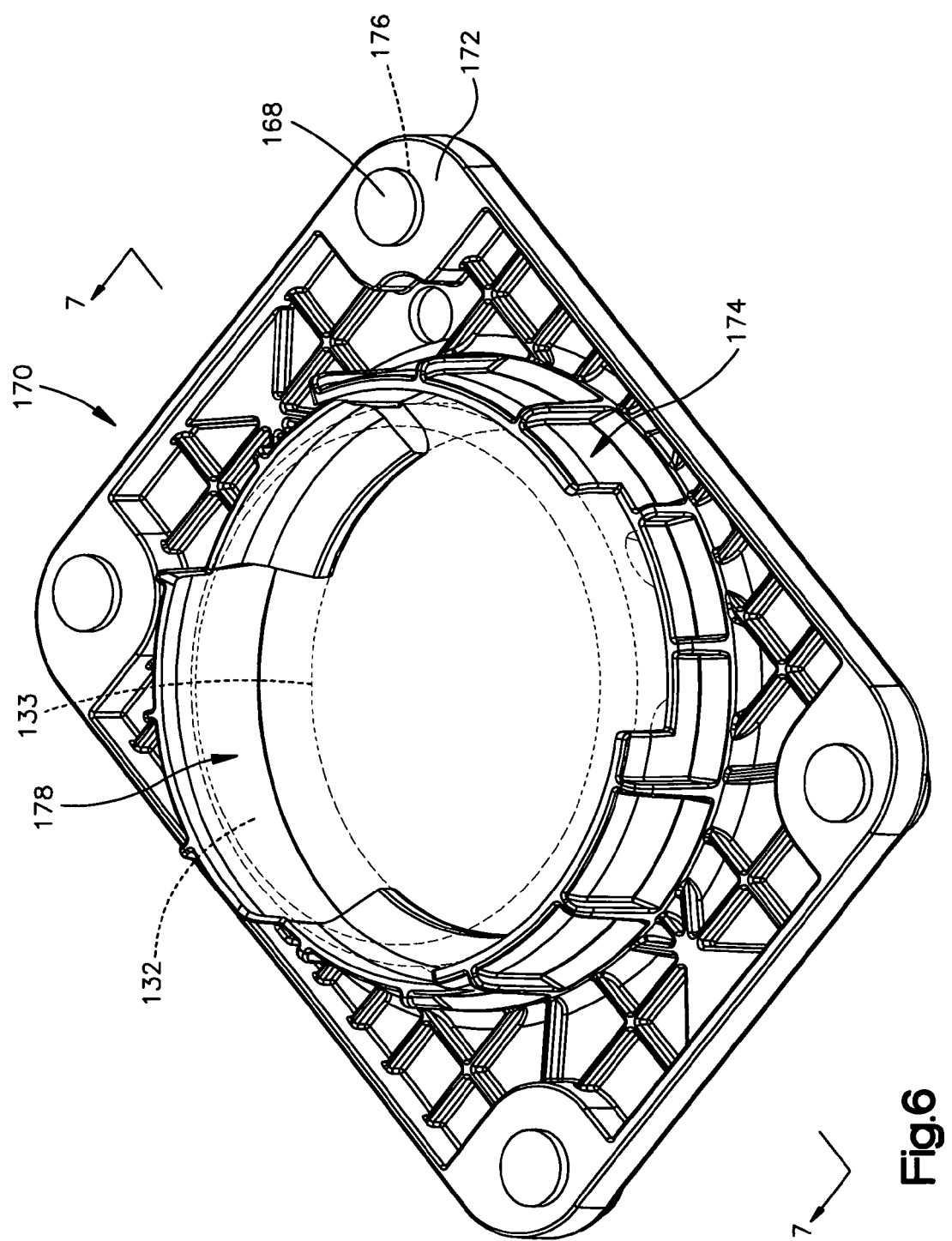
FIG. 6 is a perspective view of a portion of the apparatus of FIGS. 1 and 2 in accordance with a second embodiment of the present invention.
Figure 7:
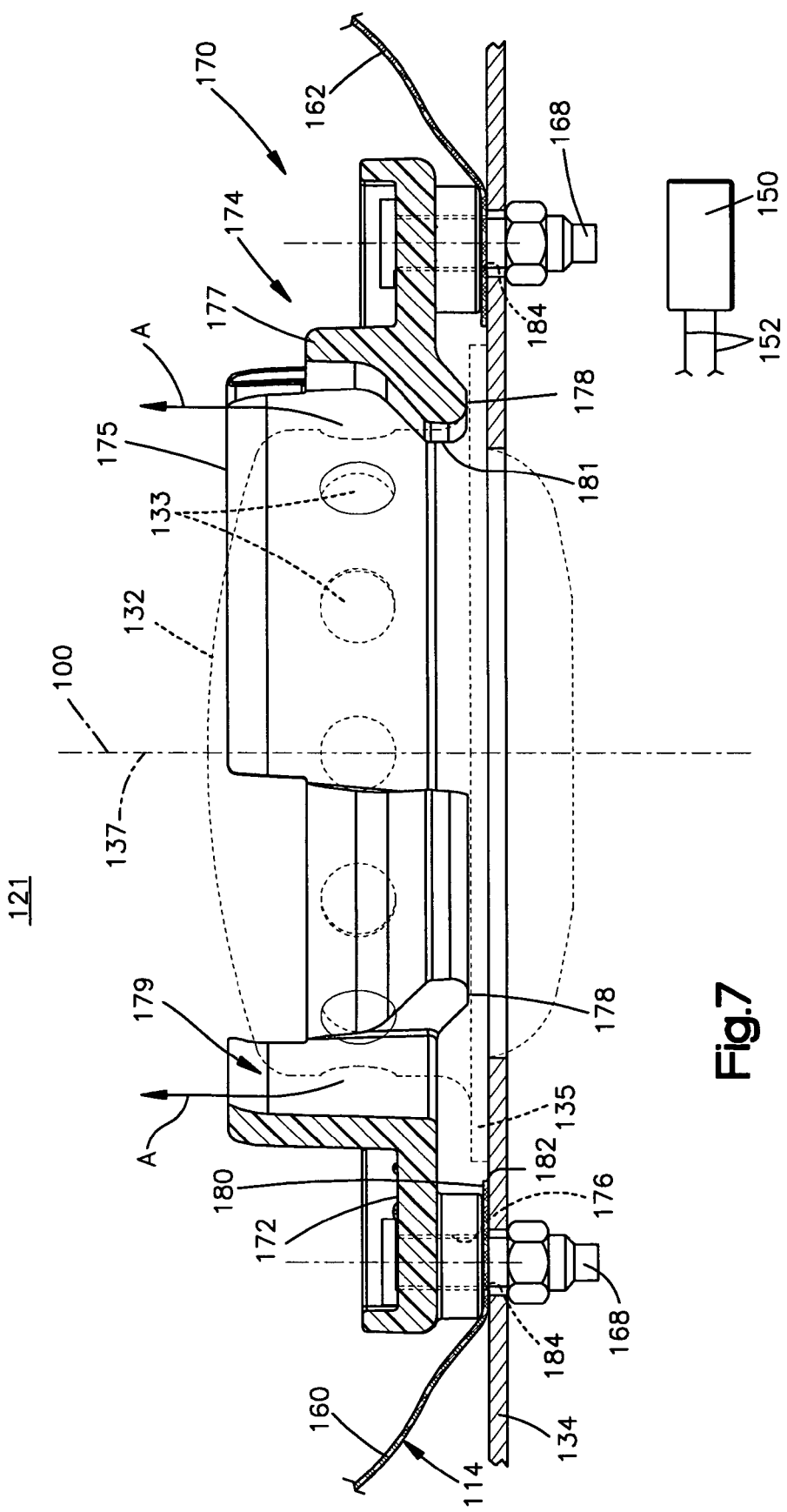
FIG. 7 is a section view of a retainer of FIG. 6 taken generally along line 7-7 in FIG. 6 and illustrated in an installed condition on a vehicle steering wheel.

A retainer 170 according to a second embodiment of the present invention is illustrated in FIGS. 6-7. The retainer 170 of the second embodiment is similar to the retainer 70 of FIGS. 3-5, with the primary exception that the annular wall of the second embodiment differs from that of the first embodiment as described herein. The retainer 170 illustrated in FIGS. 6-7 secures the inflator 132 to the reaction plate 134 and directs the flow of inflation fluid from the inflator into an inflatable volume 121 of the air bag 114. The retainer 170 of the second embodiment has a plastic, e.g. injection molded plastic, construction. Those having skill in the art, however, will appreciate that the retainer 170 could be constructed with alternative materials, such as metal. The retainer 170 includes a base portion 172 and an annular wall 174.

The base portion 172 has a generally planar, ring-shaped configuration. In the embodiment illustrated in FIGS. 6 and 7, the periphery of the base portion 172 has a generally square or rectangular ring-shaped configuration. The periphery of the base portion 172 could, however, have an alternative configuration (not shown), such as a generally round or rounded ring-shaped configuration. The base portion 172 includes a plurality of holes 176 (see FIG. 7) for receiving fasteners 168. Alternatively, the fasteners 168 are integrally formed with the base portion 172, e.g., molded into the plastic of the base portion. Although four holes 176 and corresponding fasteners 168 are illustrated, those having ordinary skill in the art will appreciate that more or fewer fasteners may be used.

The fasteners 168 cooperate with the base portion 172 of the retainer 170 to secure the retainer to a support member of the vehicle, such as the reaction plate 134. In doing so, the annular wall 174 of the retainer 170 may secure the inflator 132 to the reaction plate 134. The annular wall 174 extends from the base portion 172 and includes a retaining portion 178 and a deflector portion 177. The retaining portion 178 is configured to secure or clamp a flange portion 135 of the inflator 132 to the reaction plate 134. The retaining portion 178 may include a series of projections, a single, continuous projection or otherwise any structure capable of securing the inflator to the reaction plate 134. The retaining portion 178 may, for example, include an annular slot for receiving a portion, e.g. the flange 135, of the inflator 132.

In the embodiment illustrated in FIG. 7, the retaining portion 178 includes a plurality of angled annular projections that extend radially inward from the base portion 172 of the retainer 170 and terminate at lower end portions 181. Together, the lower end portions 181 define a central opening 179 of the retainer 170. The central opening 179 of the retainer 170 has a circumference 133 (see FIG. 6) that is less than the circumference of the flange portion 135 of the inflator 130. In the embodiment illustrated in FIG. 7, the retaining portions 178 extend at a downward angle from the plane of the base portion 172 towards the reaction plate 134. Each of the retaining portions 178 extends along an annular segment about the periphery of the central opening 179 of the retainer 170.

In this instance, during installation, the inflator 132 is maneuvered and positioned relative to the central opening 179 of the retainer 170 such that the flange portion 135 of the inflator is clamped between the lower end portions 181 of the retaining portion 178 of the annular wall 174 and the reaction plate 134 when the retainer is secured to the reaction plate via the fasteners 168. The reaction plate 134 may include structure (not shown) for receiving the flange portion 135 of the inflator 132 to hold the inflator and/or center the inflator in the central opening 179 of the retainer 170.

The retainer 170 may also help secure the air bag 114 to the vehicle 12. Referring to FIG. 7, the air bag 114 includes a mouth portion 180 that helps define an opening 182. The mouth portion 180 includes a plurality of holes 184, spaced about the periphery of the opening 182, that align with the holes 176 of the retainer 170. The mouth portion 180 of the air bag 114 is positioned between the base portion 172 of the retainer 170 and the reaction plate 134. Stud portions of the fasteners 168 are installed through the aligned holes 176 and 184 in the retainer 170 and the air bag 114, and through corresponding holes in the reaction plate 134. Nut portions of the fasteners 168 are then installed onto the stud portions to thereby interconnect the air bag 114, inflator 132, retainer 170, and reaction plate 134 to help form the air bag module 130. In this configuration, the fluid outlets 133 of the inflator 132 are positioned within the inflatable volume 121 of the air bag 114. Those having ordinary skill in the art will appreciate that the air bag module 130 may have alternative configurations.

It may be desirable to provide a gastight connection between the mouth portion 180 of the air bag 114, the base portion 172 of the retainer 170, and the reaction plate 134. Accordingly, the fasteners 168 may include shoulders (not shown), which increase the clamping surface area of the fasteners on the mouth portion 180 of the air bag 114 and, thus, help to provide a gastight connection. Furthermore, the reaction plate 134 and the base portion 172 of the retainer 170 may include mating structure (not shown) adjacent to the mouth portion 180 of the air bag 114 to help form a gastight connection.

The deflector portion 177 is configured to direct inflation fluid into the inflatable volume 121 of the air bag 114 in a direction substantially parallel to the central axis 137 of the inflator 132. This helps prevent inflation fluid from being discharged directly from the inflator 132 into contact with the mouth portion 180 of the air bag 114 as the inflation fluid initially exits the inflator outlets 133. The deflector portion 177 extends parallel to the central axis 137 of the inflator 132 and perpendicular to the base portion 172 of the retainer 170. The deflector portion 177 extends away from the plane of the base portion 172 of the retainer 170 and is positioned radially outward from the retaining portion 178 relative to the central axis 137 of the inflator 132. The deflector portion 177 extends from the retaining portion 178 and, therefore, is contiguous with the retaining portion.

The deflector portion 177 includes a plurality of extensions 175 spaced annularly about the periphery of the central opening 179 of the retainer 170. The extensions 175 may be arranged in an alternating pattern with the retaining portions 178 such that, together, the extensions and the retaining portions extend about the entire circumference of the central opening 179 of the retainer 170. Although three extensions 175 and three retaining portions 178 are illustrated in FIGS. 6-7, those having ordinary skill in the art will appreciate that any combination of annular wall portions and clamping portions may be used in accordance with the present invention.

Each extension 175 extends away from the base portion 172 and towards the central axis 137 of the inflator 132. That is, the extensions 175 have a generally concave configuration, facing concavely inward toward the central axis 137, as viewed in FIG. 7. The extensions 175 and the deflector portion 177 exhibit a generally concentric orientation relative to each other and the inflator 132.

Advantageously, the annular wall 174 is configured such that inflation fluid exiting the inflator outlets 133 initially strikes the deflector portion 177. In particular, the annular wall 174 is positioned such that the deflector portion 177 covers a substantial area of the inflator outlets 133. The deflector portion 177, by extending substantially orthogonal to the base portion 172 of the retainer 170 and covering the area of the inflator outlets 133, directs the inflation fluid away from the mouth portion 180 of the air bag 114 in a direction, indicated generally at A in FIG. 7, substantially parallel to the central axis 137 of the inflator 132. Directing the inflation fluid in this manner helps prevent inflation fluid from initially being discharged directly from the inflator 132 into contact with the mouth portion 180 of the air bag 114 and, thus, avoids immediate contact between hot inflation fluid exiting the inflator and the air bag.

The inflation fluid outlets 133 may be spaced uniformly around the periphery of the inflator 132 such that inflation fluid is emitted from the inflator in a substantially uniform manner, e.g., in terms of volumetric flow. Accordingly, the inflation fluid may be directed in the direction A in a substantially uniform manner. The deflector portion 177 thereby may direct inflation fluid into both the upper portion 160 and the lower portion 162 of the air bag 114 in a manner such that the upper and lower portions inflate at substantially the same rate. Consequently, for a given period of inflation time, the upper portion 160 of the air bag 114 may receive roughly the same volume of inflation fluid as the lower portion 162 of the air bag. The large volumetric flow into the upper and lower portions 160, 162 of the air bag 114 helps the air bag cover the upper and lower portions 144, 146 of the steering wheel rim 126 quickly, thus helping to protect the vehicle occupant 120, who may be sitting in close proximity to the steering wheel 136.

Those skilled in the art will appreciate that the configuration of the retainer may vary depending on a variety of factors, such as the vehicle architecture, space limitations within the vehicle, and the configuration of airbag module components, such as the inflator. Those skilled in the art will also appreciate that the deflector portion portions 175 and 177 can be adapted or configured to accommodate these various alternative configurations of the retainer 170 without departing from the spirit of the present invention.

From the above description of the invention, those skilled in the art will perceive improvements, changes and modifications. For example, the retainer could be used with a passenger side air bag. Such improvements, changes and modifications within the skill of the art are intended to be covered by the appended claims.

Having described the invention, the following is claimed:

1. An apparatus for helping to protect an occupant of a vehicle, the apparatus comprising:
    an inflatable vehicle occupant protection device that is inflatable from a deflated condition to an inflated condition;
    an inflator having a central axis, a flange and inflation fluid outlets, the inflator being actuatable to provide inflation fluid through the inflation fluid outlets in a direction transverse to the central axis for inflating the protection device; and
    a retainer having an opening for receiving the inflator, the retainer comprising a continuous thin wall of uniform thickness, the continuous thin wall comprising:
    a base portion that extends perpendicular to the central axis; and
    an annular wall that extends transversely from the base portion, the annular wall having a deflector portion and a retaining portion,
    the deflector portion being positioned radially outward from the retaining portion and extending substantially orthogonal to the base portion to direct inflation fluid from the inflator into the protection device in a direction substantially parallel to the central axis of the inflator,
    the retaining portion extending radially inward from the deflector portion and clamping the flange of the inflator to a support member, the retaining portion comprising a first portion that extends substantially parallel to the deflector portion and a second portion that extends transverse to the first portion and the deflector portion and interconnects the first portion and deflector portion.

2. The apparatus recited in claim 1, wherein the deflector portion and the retaining portion are contiguous with one another.

3. The apparatus recited in claim 1, wherein the support member comprises a reaction plate.

4. The apparatus recited in claim 1, wherein the deflector portion and the retaining portion help define an annular space about the inflator, the deflector portion directing the inflation fluid out of the annular space in a substantially uniform manner.

5. The apparatus recited in claim 1, wherein the deflector portion deflects inflation fluid away from a mouth portion of the protection device secured to the base portion of the retainer.

6. The vehicle safety apparatus of claim 1, wherein the volumetric flow of the inflation fluid directed by the deflector portion into the protection device is substantially uniform.

7. The apparatus recited in claim 1, wherein the inflation fluid engages the deflector portion and is directed away from a mouth portion of the protection device secured to the base portion of the retainer to prevent damage to the mouth portion.

8. The apparatus recited in claim 1, wherein the deflector portion covers at least 75% of an area of the inflation fluid outlets.

9. The apparatus of claim 1, wherein the retaining portion is substantially C-shaped and connects the deflecting portion to the base portion.

10. The apparatus of claim 1, wherein the retaining portion and the deflector portion are not co-planar with one another.

11. An apparatus for helping to protect an occupant of a vehicle, the apparatus comprising:
    an inflatable vehicle occupant protection device that is inflatable from a deflated condition to an inflated condition;
    an inflator having a flange and inflation fluid outlets, the inflator being actuatable to provide inflation fluid through the inflation fluid outlets for inflating the protection device; and
    a retainer having an opening for receiving the inflator, the retainer comprising:
    a base portion extending along a plane; and
    an annular wall that extends transversely from the base portion, the annular wall having a deflector portion and a retaining portion,
    the deflector portion being positioned radially outward from the retaining portion and extending above the plane substantially orthogonal to the base portion to direct inflation fluid from the inflator into the protection device in a direction substantially parallel to a central axis of the inflator,
    the retaining portion extending radially inward from the deflector portion and below the plane of the base portion for clamping the flange of the inflator to a support member.

12. The apparatus recited in claim 11, wherein the deflector portion and the retaining portion are contiguous with one another.

13. The apparatus recited in claim 11, wherein the deflector portion further includes an extension extending towards the central axis for directing inflation fluid from the inflator into the protection device.

14. The apparatus recited in claim 11, wherein the deflector portion and the retaining portion help define an annular space about the inflator, the deflector portion directing the inflation fluid out of the annular space in a substantially uniform manner.

15. The apparatus recited in claim 11, wherein the retaining portion comprises a plurality of annular wall segments spaced annularly about the opening in the retainer.

16. The apparatus recited in claim 15, wherein the wall segments are arranged in an alternating pattern with extensions of the deflector portions such that, together, the retaining portion and the extensions extend about the entire circumference of the opening.

17. The apparatus recited in claim 11, wherein the inflation fluid engages the deflector portion and is directed away from a mouth portion of the protection device secured to the base portion of the retainer to prevent damage to the mouth portion.

18. The apparatus recited in claim 11, wherein the deflector portion covers at least 75% of an area of the inflation fluid outlets.

19. The apparatus recited in claim 11, wherein the retainer is constructed of plastic.

* * * * *